US008319743B2

(12) United States Patent
No et al.

(10) Patent No.: US 8,319,743 B2
(45) Date of Patent: Nov. 27, 2012

(54) TOUCH SCREEN DISPLAY

(75) Inventors: Sang-Yong No, Seoul (KR); Young-Je Cho, Cheonan-si (KR); Sung-Hoon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 378 days.

(21) Appl. No.: 12/540,580

(22) Filed: Aug. 13, 2009

(65) Prior Publication Data
US 2010/0053103 A1   Mar. 4, 2010

(30) Foreign Application Priority Data

Aug. 27, 2008 (KR) ................. 10-2008-0083951

(51) Int. Cl.
*G06F 3/041* (2006.01)
(52) U.S. Cl. ....................................... 345/173
(58) Field of Classification Search .......... 345/173–178; 178/18.01–18.06; 349/12
See application file for complete search history.

(56) References Cited

U.S. PATENT DOCUMENTS

| | | | | |
|---|---|---|---|---|
| 6,016,140 A * | 1/2000 | Blouin et al. | ................. | 345/178 |
| 6,281,952 B1 * | 8/2001 | Okamoto et al. | ............... | 349/12 |
| 6,483,498 B1 * | 11/2002 | Colgan et al. | ................ | 345/173 |
| 6,501,529 B1 * | 12/2002 | Kurihara et al. | ............... | 349/160 |
| 6,638,781 B1 * | 10/2003 | Hirakata et al. | ................ | 438/30 |
| 6,876,355 B1 * | 4/2005 | Ahn et al. | ..................... | 345/173 |
| 7,274,424 B1 * | 9/2007 | Kurihara et al. | ............... | 349/155 |
| 7,742,041 B2 * | 6/2010 | Lee et al. | ........................ | 345/173 |
| 2003/0141118 A1 * | 7/2003 | Kakuno | ...................... | 178/18.01 |
| 2006/0017710 A1 * | 1/2006 | Lee et al. | ........................ | 345/173 |
| 2007/0262967 A1 * | 11/2007 | Rho | ................................ | 345/173 |
| 2008/0100590 A1 * | 5/2008 | Hur et al. | ........................ | 345/173 |
| 2009/0091546 A1 * | 4/2009 | Joo et al. | ........................ | 345/173 |

FOREIGN PATENT DOCUMENTS

| | | |
|---|---|---|
| JP | 2002157089 | 5/2002 |
| JP | 2004014339 | 1/2004 |
| KR | 1020030055923 | 7/2003 |
| KR | 1020040056011 | 6/2004 |

OTHER PUBLICATIONS

Dirk M. Guidi, "Nanotubes see the light," May 3, 2007, Nature, vol. 447, pp. 50-51.*

* cited by examiner

*Primary Examiner* — Alexander Eisen
*Assistant Examiner* — Sanjiv D Patel
(74) *Attorney, Agent, or Firm* — Cantor Colburn LLP

(57) ABSTRACT

A touch screen display includes; a first substrate, a lower sensor electrode disposed on the first substrate, a second substrate disposed substantially opposite to the first substrate, a sensor spacer disposed on the second substrate and aligned with the lower sensor electrode, a common electrode disposed on the second substrate, an upper sensor electrode disposed on the sensor spacer and connected to the common electrode, and a cutout disposed at an edge of the upper sensor electrode, wherein when touch pressure is applied to the first or second substrate, a change in capacitance is generated due to a change in a distance between the lower sensor electrode and the upper sensor electrode at a touch position, such that the touch position is detected on the basis of the change in capacitance.

16 Claims, 12 Drawing Sheets

TOUCH SCREEN DISPLAY

This application claims priority to Korean Patent Application No. 10-2008-0083951, filed on Aug. 27, 2008, and all the benefits accruing therefrom under 35 U.S.C. §119, the contents of which in its entirety are herein incorporated by reference.

BACKGROUND OF THE INVENTION

1. Field of the Invention

The present invention relates to a display device, and more particularly, to a touch screen display.

2. Description of the Related Art

A touch screen display is an advanced input device which may be substituted for a keyboard and a mouse. In the touch screen display, a touch screen is mounted on a liquid crystal panel, and a user touches the touch panel to conduct a desired operation. The touch screen display enables the user to conduct institutive operations under a Graphic User Interface ("GUI") environment (one example of which is the Windows™ operating system), and it may be widely used in computer-aided training and simulation applications, office automation applications, education applications, and game applications.

Such a touch screen display typically includes a liquid crystal panel for displaying image information, a touch panel mounted on the liquid crystal panel, a controller, a device driver and application software.

The liquid crystal panel includes a common electrode display plate having a common electrode, and a thin film transistor ("TFT") display plate having a thin film transistor array disposed thereon. The common electrode display plate and the TFT display plate are disposed opposite to each other and bonded to each other by a seal line interposed between the two display plates. A liquid crystal layer is formed in a space between the two display plates. As such, the liquid crystal panel includes the two display plates (the common electrode display plate and the TFT display plate) and the liquid crystal layer interposed between the two display plates. A voltage applied to the electrodes reorders the liquid crystal molecules of the liquid crystal layer, and thus the amount of light transmitted through the liquid crystal layer is controlled. Thus, a desired image is displayed. The liquid crystal panel is a non-luminous element, and thus a backlight unit for supplying light is disposed on a rear side of the TFT display plate. The amount of light being emitted from the backlight unit and transmitted through the liquid crystal layer is controlled in accordance with the alignment state of the liquid crystal molecules.

The touch panel includes two substrates arranged to be opposed to each other, upper and lower conductive layers individually formed respectively on the two substrates, and a plurality of spacers interposed between the two substrates. If a user touches a specific point using his/her finger or a pen, the upper and lower conductive layers are brought into electrical contact with each other at the specific point, and positional information is acquired.

Such a touch screen display is basically used for a Personal Digital Assistant ("PDA"), and in recent years, it is mounted on a portable communication device (for example, a mobile phone).

In the known touch screen display in which a touch panel is mounted on the liquid crystal panel to acquire positional information, the entire display device is large in size, which makes it difficult for the user to carry the display device. For this reason, there is a need for a touch screen display that is compact and light-weight and that can be provided by a simple manufacturing process.

BRIEF SUMMARY OF THE INVENTION

Aspects of the present invention provide a touch screen display that is compact and light-weight.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an exemplary embodiment of the present invention, a touch screen display includes; a first substrate, a lower sensor electrode disposed on the first substrate, a second substrate disposed substantially opposite to the first substrate, a sensor spacer disposed on the second substrate and aligned with the lower sensor electrode, a common electrode disposed on the second substrate, an upper sensor electrode disposed on the sensor spacer and connected to the common electrode, and a cutout disposed at an edge of the upper sensor electrode, wherein when touch pressure is applied to the first or second substrate, a change in capacitance is generated due to a change in a distance between the lower sensor electrode and the upper sensor electrode at a touch position, such that the touch position is detected on the basis of the change in capacitance.

In one exemplary embodiment, the cutout may partially separate the upper sensor electrode and the common electrode.

In one exemplary embodiment, the sensor spacer may include a flat surface disposed substantially opposite to the first substrate and a side portion disposed at an edge of the flat surface, and the upper sensor electrode may be disposed on the flat surface.

In one exemplary embodiment, the upper sensor electrode may have an area smaller than the flat surface of the sensor spacer.

In one exemplary embodiment, the touch screen display may further include a connection electrode disposed on the side portion of the sensor spacer which connects the upper sensor electrode and the common electrode.

In one exemplary embodiment, the connection electrode may have a width smaller than the upper sensor electrode.

In one exemplary embodiment, two or more connection electrodes may be disposed on the side portion of the sensor spacer.

In one exemplary embodiment, the sensor spacer may include an organic material, and in one exemplary embodiment the organic material may be a photosensitive resin.

In one exemplary embodiment, the touch screen display may further include a cell gap spacer interposed between the first and second substrate which maintains a cell gap between the first and second substrates, wherein the sensor spacer may include substantially the same material as the cell gap spacer.

In one exemplary embodiment, the sensor spacer may be a laminate of at least one color filter.

In one exemplary embodiment, the sensor spacer may include a first color filter and a second color filter sequentially laminated on the second substrate, and the second color filter may entirely cover the first color filter.

In one exemplary embodiment, the touch screen display may further include an insulating layer interposed between the sensor spacer and the upper sensor electrode.

In one exemplary embodiment, the touch screen display may further include an overcoat layer interposed between the substrate and the sensor spacer.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1A:
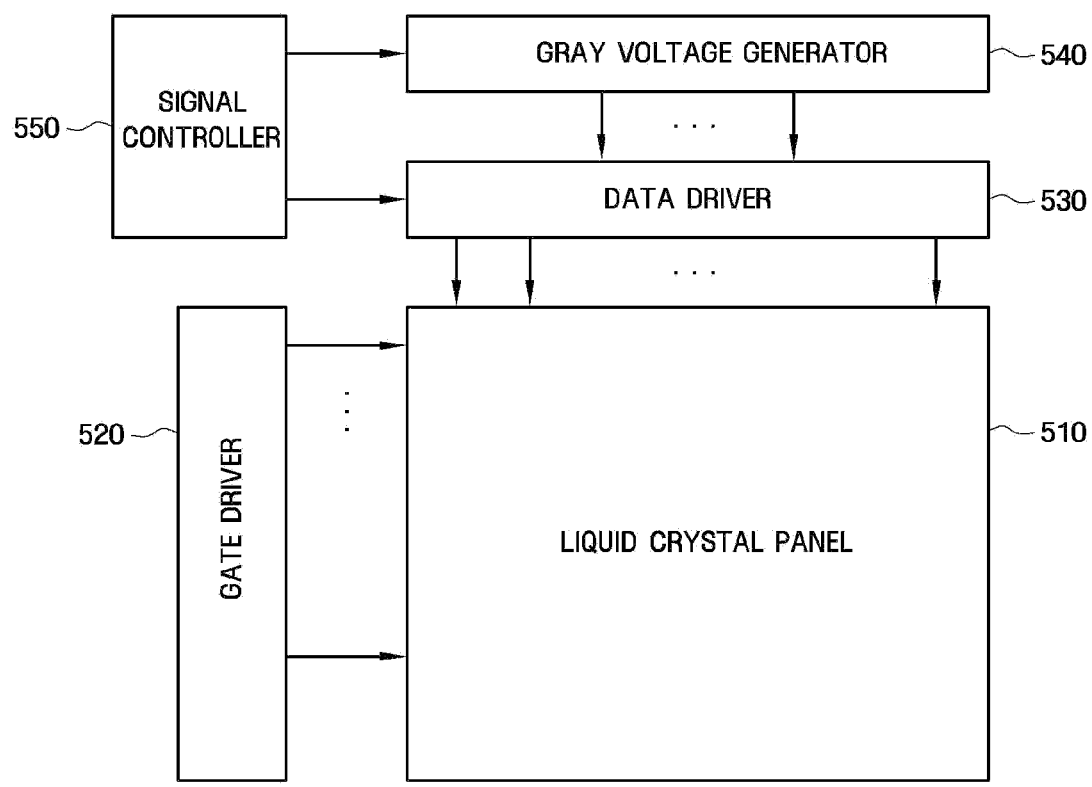
FIG. 1A is a block diagram of an exemplary embodiment of a touch screen display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, an exemplary embodiment of a touch screen display according to several different exemplary embodiments of the present invention will be described in detail with reference to the accompanying drawings.

Figure 1B:
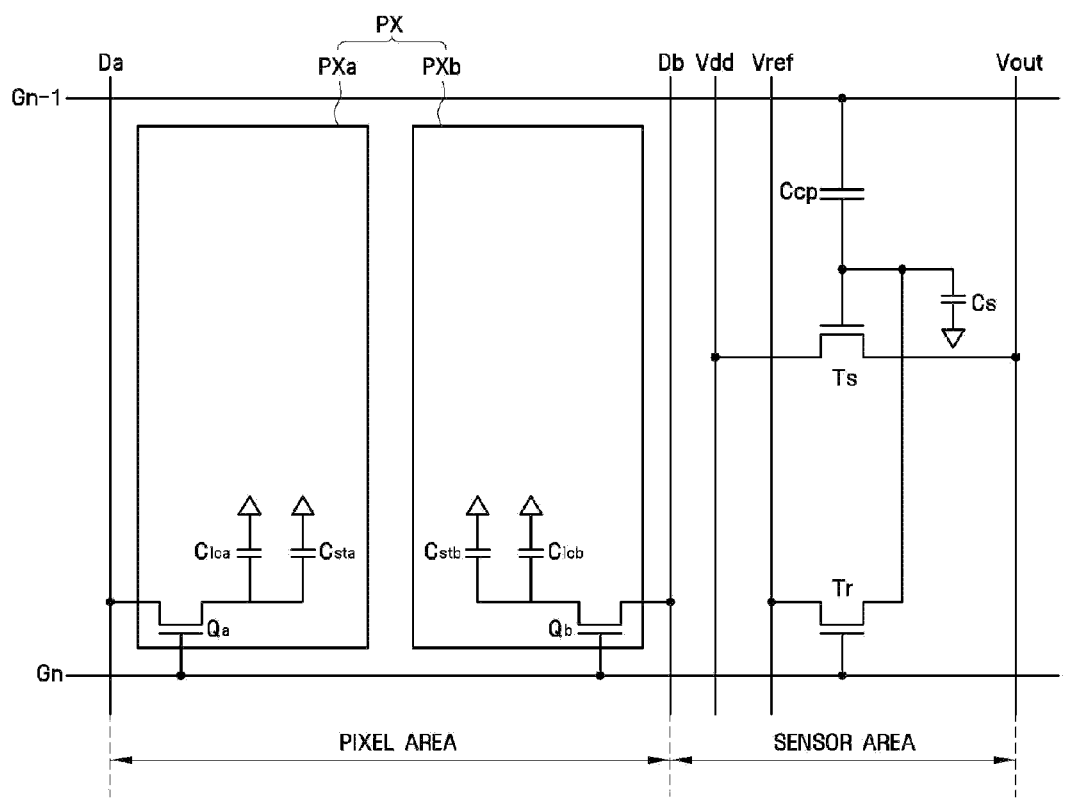
FIG. 1B is an equivalent circuit diagram of one pixel of an exemplary embodiment of a touch screen display according to the present invention.

FIG. 1A is a block diagram of an exemplary embodiment of a touch screen display according to the present invention, and FIG. 1B is an equivalent circuit diagram of one pixel of an exemplary embodiment of a touch screen display according to the present invention.

A touch screen display according to each of the exemplary embodiments of the present invention includes a liquid crystal panel assembly, a gate driver and a data driver connected to the liquid crystal panel assembly, and a gray voltage generator connected to the data driver, and a signal controller controlling them.

The liquid crystal panel assembly includes a plurality of display signal lines, and a plurality of pixels PX correspondingly connected to the display signal lines and arranged in a matrix shape. The liquid crystal panel assembly includes a lower display plate and an upper display plate arranged substantially opposite to each other, and a liquid crystal layer interposed between the two display plates.

Referring to FIGS. 1A and 1B, the liquid crystal panel assembly is divided into a pixel area where an image is displayed, and a sensor area where a touch operation by a user is detected.

First, the pixel area will be described.

The display signal lines are provided on the lower display plate, and include a plurality of gate lines, two of which include Gn and Gn−1, for transmitting gate signals and data lines, two of which include Da and Db, for transmitting data signals. The gate lines Gn and Gn−1 extend in a row direction to be substantially parallel with each other, and the data lines Da and Db extend in a column direction to be substantially parallel with each other.

Each pixel PX includes a pair of subpixels PXa and PXb, and the subpixels PXa and PXb include switching elements Qa and Qb, respectively, correspondingly connected to the data lines Da and Db and a single n-th gate line Gn, liquid crystal capacitors Clca and Clcb correspondingly connected to the switching elements Qa and Qb, respectively, and storage capacitors Csta and Cstb correspondingly connected to the liquid crystal capacitors Clca and Clcb, respectively. That is, a pair of subpixels PXa and PXb is allocated with two data lines Da and Db and a single n-th gate line Gn. Alternative exemplary embodiments include configurations wherein the storage capacitors Csta and Cstb may be omitted.

The switching elements Qa and Qb individually provided in the subpixels PXa and PXb are formed by thin film transistors ("TFTs") on the lower display plate. Each of the switching elements Qa and Qb is a three-terminal element having a control terminal (hereinafter, referred to as a gate electrode) connected to the n-th gate line Gn, to which a corresponding gate signal is applied, an input terminal (hereinafter, referred to as a source electrode) connected to a corresponding one of the data lines Da and Db, and an output terminal (hereinafter, referred to as a drain electrode) connected to a corresponding one of the liquid crystal capacitors Clca and Clcb and a corresponding one of the storage capacitors Csta and Cstb.

Each of the liquid crystal capacitors Clca and Clcb has as two terminals a subpixel electrode of the lower display plate and a common electrode of the upper display plate. The liquid crystal layer between the subpixel electrode and the common electrode serves as a dielectric. The subpixel electrodes Pa and Pb are correspondingly connected to the switching elements Qa and Qb. In one exemplary embodiment, the common electrode is formed on the entire surface of the upper display plate, and is applied with a common voltage Vcom. Alternative exemplary embodiments include configurations wherein the common electrode may be provided on the lower display plate. In such an alternative exemplary embodiment at least one of the subpixel electrode and the common electrode may have a linear or stripe shape.

Each of the storage capacitors Csta and Cstb individually assisting the liquid crystal capacitors Clca and Clcb is formed by a storage wiring and a corresponding subpixel electrode arranged to overlap each other on the lower display plate with a dielectric interposed therebetween. A prescribed voltage, such as the common voltage Vcom, is applied to the storage wiring. Exemplary embodiments include configurations wherein each of the storage capacitors Csta and Cstb may be formed by a corresponding subpixel electrode and an (n−1)th gate line arranged to overlap each other with a dielectric interposed therebetween.

For achievement of color display, one exemplary embodiment includes a configuration wherein each pixel uniquely displays one of the primary colors (spatial division) or alternative exemplary embodiments include configurations wherein each pixel alternately displays the primary colors as time elapses (temporal division), and a desired color is recognized by a spatial and temporal sum of three primary colors. Exemplary embodiments of the primary colors include red, green, and blue. As an example of spatial division, each pixel may have one color filter for among the primary colors in an area of the upper display plate disposed corresponding to the pixel. Alternative exemplary embodiments include configurations wherein the color filter may be formed below of the subpixel electrode of the lower display plate.

The gate driver is connected to the gate lines Gn and Gn−1, and applies the gate signals, which are combinations of a gate-on voltage Von and a gate-off voltage Voff from the outside, to the gate lines Gn and Gn−1.

The gray voltage generator generates two sets of gray voltages (or sets of reference gray voltages) related to transmittance of the pixel, and supplies the two sets of gray voltages to the data driver. The two sets of gray voltages are independently supplied to the two subpixels constituting one pixel. However, the present invention is not limited thereto, and alternative exemplary embodiments include configurations wherein only one set of gray voltages may be generated instead of the two sets of gray voltages.

The data driver is connected to a pair of data lines Da and Db. The data driver transmits a data voltage to one of a pair of subpixels constituting one pixel through the first data line Da, and transmits a different data voltage to the other subpixel through the second data line Db.

Exemplary embodiments include configurations wherein the gate driver or the data driver may be directly mounted on the liquid crystal panel assembly in the form of a plurality of driving integrated circuit ("IC") chips, or may be mounted on a flexible printed circuit ("FPC") film and attached to the liquid crystal panel assembly in the form of a tape carrier package ("TCP"). Alternatively, the gate driver or the data driver may be integrated directly into the liquid crystal panel assembly, together with the display signal lines Gn, Gn−1, Da, and Db and the thin film transistor switching elements Qa and Qb.

The signal controller controls the operations of the gate driver and the data driver.

Next, the sensor area will be described.

A power line Vdd, a refresh line Vref, and an output line Vout are formed on the lower display plate to extend substantially in the column direction to be substantially in parallel with each other and with the data lines Da and Db.

The sensor area is provided with a sensor switching element Ts for determining whether or not an external force is applied to the liquid crystal panel assembly, and a refresh switching element Tr for refreshing a sensor capacitor Cs connected to the sensor switching element Ts for each frame. The sensor switching element Ts and the refresh switching element may be formed by TFTs on the lower display plate.

The sensor switching element Ts has an input terminal (hereinafter, referred to as a sensor source electrode) connected to the power line Vdd, an output terminal (hereinafter, referred to as a sensor drain electrode) connected to the output line Vout, and a control terminal (hereinafter, referred to as a sensor gate electrode) connected to the (n−1)th gate line Gn−1 through a coupling capacitor Ccp. The sensor capacitor Cs is connected to the sensor gate electrode of the sensor switching element Ts. The sensor capacitor Cs whose capacitance is changed in accordance with the touch operation of the user has as two terminals a lower sensor electrode of the lower display plate and an upper sensor electrode of the upper display plate. The liquid crystal layer between the lower sensor electrode and the upper sensor electrode serves as a dielectric.

If the gate-on voltage Von is applied to the (n−1)th gate line Gn−1, and the sensor switching element Ts is turned on, a sensing voltage which is applied to the sensor source electrode from the power line Vdd is transmitted to the output line Vout through the sensor drain electrode. In one exemplary embodiment, the sensing voltage may be, for example, in a range of about 10 V to about 15 V. The sensor gate electrode is connected to the (n−1)th gate line Gn−1 through the coupling capacitor Ccp, and the sensor capacitor Cs, whose capacitance is changed in accordance with the touch operation, is connected to the sensor gate electrode. For this reason, a voltage to be applied to the sensor gate electrode is changed in accordance with the touch operation, and accordingly the sensing voltage to be transmitted to the output line Vout is changed in magnitude. Therefore, by detecting the amount of the sensing voltage output from the sensor drain electrode to the output line Vout, it is possible to determine whether or not the touch operation is conducted.

The refresh switching element Tr has an input terminal (hereinafter, referred to as a refresh source electrode) connected to the refresh line Vref, an output terminal (hereinafter, referred to as a refresh drain electrode) connected to the sensor gate electrode, and a control terminal (hereinafter, referred to as a refresh gate electrode) connected to the n-th gate line Gn.

If the gate-on voltage Von is applied to the n-th gate line Gn, and the refresh switching element Tr is turned on, a refresh voltage which is applied to the refresh source electrode from the refresh line Vref is transmitted to the sensor gate electrode through the refresh drain electrode. In one exemplary embodiment the refresh voltage may be, for example, at about −5 V. After the sensor switching element Ts detects the touch operation, the refresh voltage is supplied to the sensor switching element Ts for each frame, to thereby refresh the sensor switching element Ts.

An exemplary embodiment of a touch sensing method in the exemplary embodiment of a touch screen display according to each of the exemplary embodiments of the present invention will now be described with reference to FIG. 1.

When a force is applied to the touch screen display, the lower display plate and the upper display plate approach each other at a portion where the force is applied. Accordingly, the lower sensor electrode and the upper sensor electrode constituting the sensor capacitor Cs approach each other, and thus sensor capacitance of the sensor capacitor Cs is increased.

If the gate-on voltage Von is applied to the (n−1)th gate line Gn−1, the sensing voltage is transmitted to the sensor switching element Ts. Specifically, one terminal of the coupling capacitor Ccp and one terminal of the sensor capacitor Cs are connected to sensor gate electrode. The gate-on voltage Von is applied to the other terminal of the coupling capacitor Ccp, and the common voltage Vcom is applied to the other terminal of the sensor capacitor Cs.

When the user touches the touch screen display, sensor capacitance of the sensor capacitor Cs is increased, and accordingly sensor capacitance has a larger effect on the voltage applied to the sensor gate electrode. The common voltage which is applied to the other terminal of the sensor capacitor Cs is lower than the gate-on voltage Von. For this reason, the voltage to be applied to the sensor gate electrode is decreased, and the sensing voltage to be transmitted to the output line Vout through the sensor switching element Ts is also decreased. Therefore, by measuring a change in the sensing voltage detected on the output line Vout, it is possible to determine whether or not a touch operation is conducted.

A touch screen display according to a first exemplary embodiment of the present invention will now be described in detail with reference to FIGS. 2 to 8. A touch screen display of this exemplary embodiment includes a lower display plate having a TFT array formed thereon, an upper display plate arranged to be substantially opposite to the lower display plate, and a liquid crystal layer interposed between the two display plates.

Figure 2:
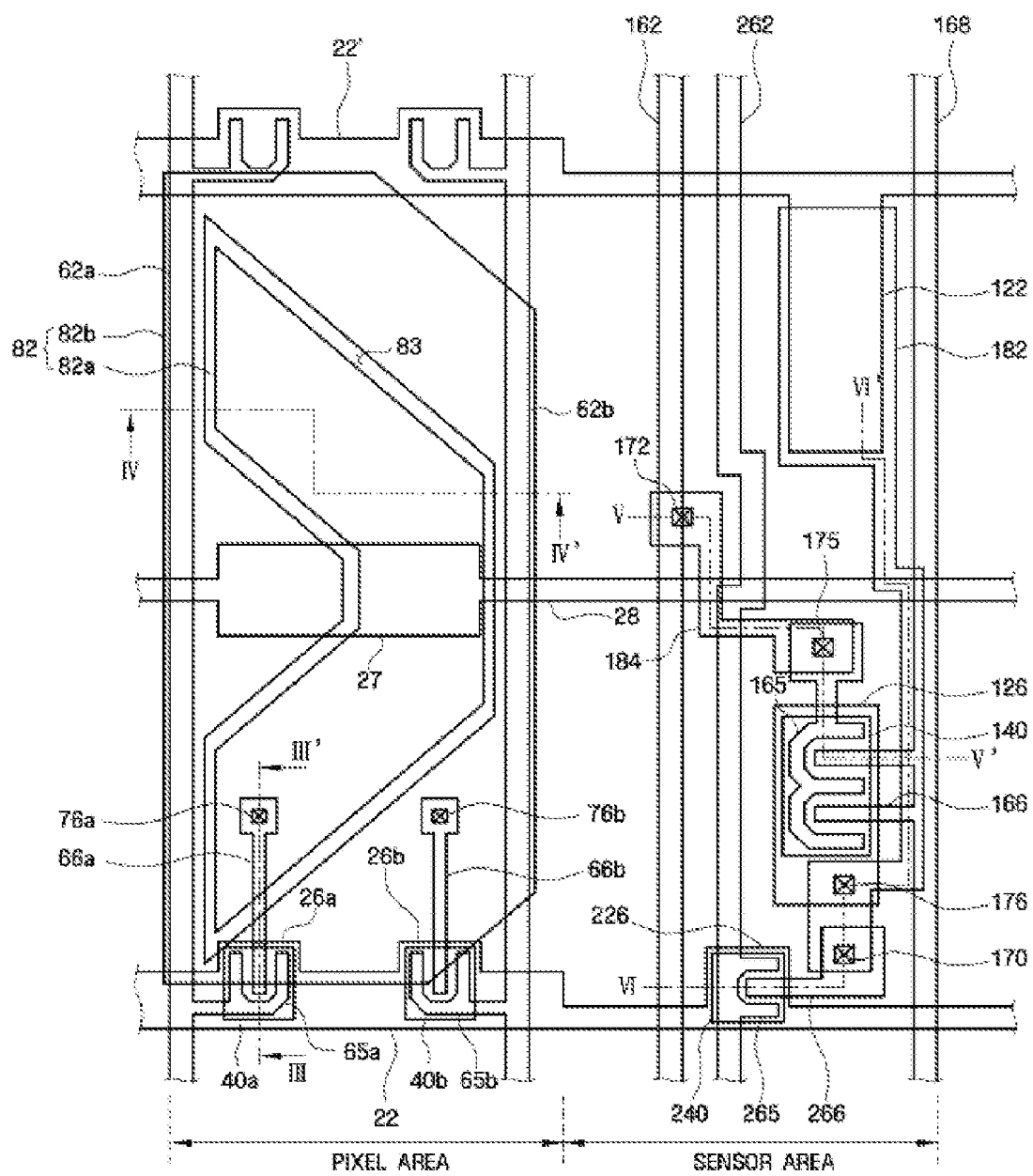
FIG. 2 is a top plan view of an exemplary embodiment of a lower display plate of the exemplary embodiment of a touch screen display shown in FIG. 1.
Figure 3:
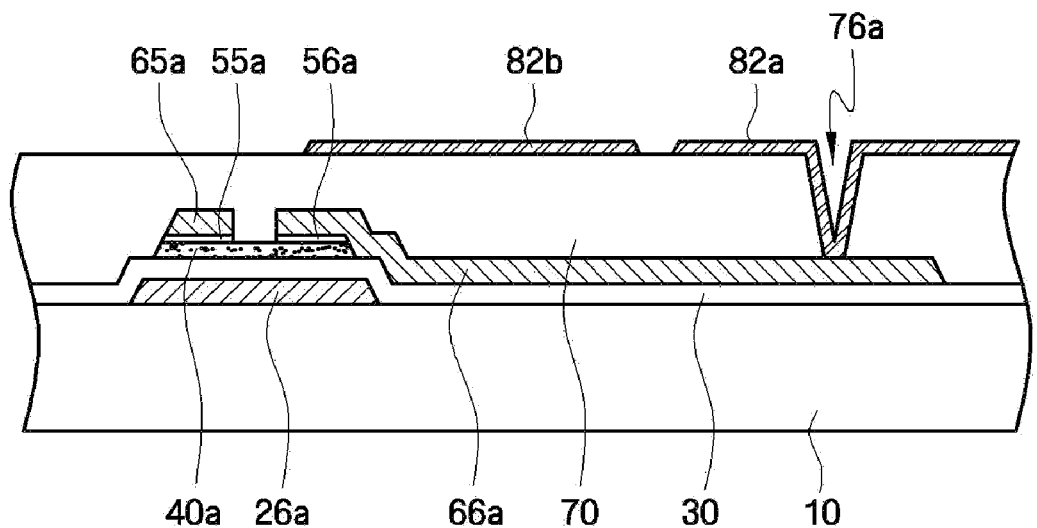
FIG. 3 is a cross-sectional view of the exemplary embodiment of a lower display plate taken along line III-III of FIG. 2.
Figure 4:
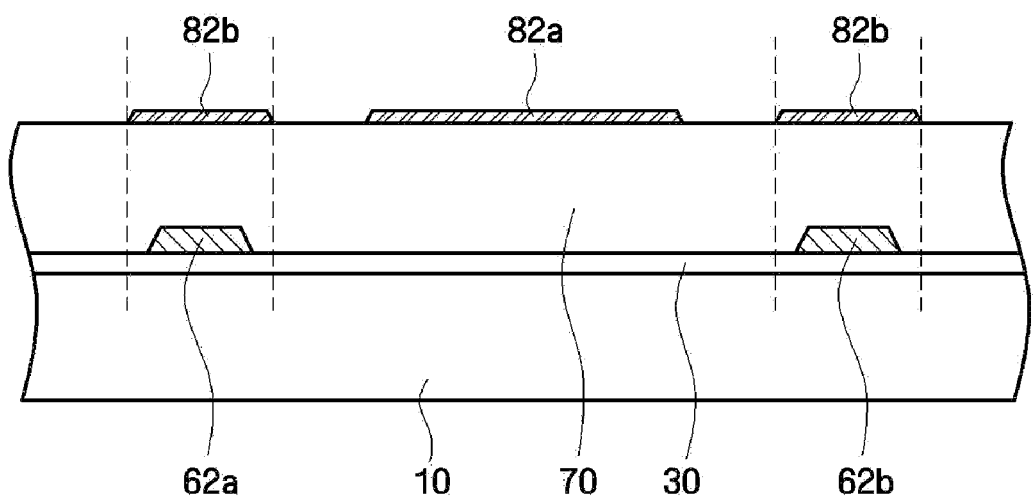
FIG. 4 is a cross-sectional view of the exemplary embodiment of a lower display plate taken along line IV-IV of FIG. 2.
Figure 5:
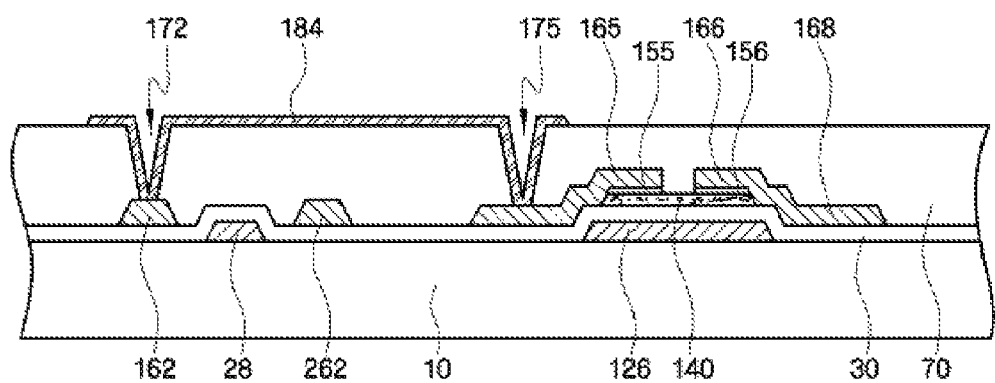
FIG. 5 is a cross-sectional view of the exemplary embodiment of a lower display plate taken along line V-V of FIG. 2.
Figure 6:
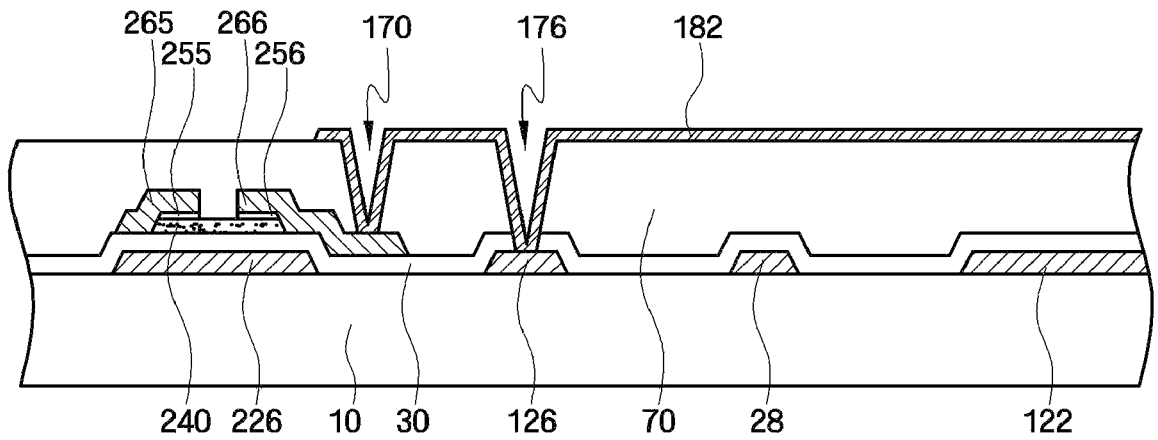
FIG. 6 is a cross-sectional view of the exemplary embodiment of a lower display plate taken along line VI-VI of FIG. 2.

First, a first exemplary embodiment of a lower display plate of the touch screen display according to the present invention will be described in detail with reference to FIGS. 2 to 6. FIG. 2 is a top plan view of the lower display plate of the exemplary embodiment of a touch screen display shown in FIG. 1. FIG. 3 is a cross-sectional view of the exemplary embodiment of a lower display plate taken along line III-III of FIG. 2. FIG. 4 is a cross-sectional view of the exemplary embodiment of a lower display plate taken along line IV-V of FIG. 2. FIG. 5 is a cross-sectional view of the exemplary embodiment of a lower display plate taken along line V-V of FIG. 2. FIG. 6 is a cross-sectional view of the exemplary embodiment of a lower display plate taken along line VI-VI of FIG. 2.

First, the pixel area in the first exemplary embodiment of a touch screen display according to the present invention will be described.

Referring to FIGS. 2 to 4, a gate line 22 for transmitting a gate signal is formed on an insulating substrate 10, exemplary embodiments of which may be made of transparent glass, to extend in a substantially horizontal direction. A pair of first and second gate electrodes 26a and 26b are formed to protrude from the gate line 22. The gate line 22 and the first and second gate electrodes 26a and 26b are collectively referred to as a gate wiring line.

A storage line 28 is also formed on the insulating substrate 10 to extend in a direction substantially parallel with the gate line 22 across the pixel area, and a wide storage electrode 27 connected to the storage line 28 is formed. The storage electrode 27 overlaps a pixel electrode 82 and forms a storage capacitor for improving charge maintaining ability of the pixel. The storage electrode 27 and the storage line 28 are collectively referred to as a storage wiring. In this exemplary embodiment, the storage wiring (27, 28) is formed to correspond to the center of the pixel region, but this is not intended to limit the present invention. The shape and arrangement of the storage wiring (27, 28) may be modified in various ways. In the exemplary embodiment wherein sufficient storage capacitance is generated by the pixel electrode 82 and the gate line 22 arranged to overlap each other, the storage wiring (27, 28) may be omitted.

In one exemplary embodiment, the gate wiring (22, 26a, 26b) and the storage wiring (27, 28) may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum (Mo) or a molybdenum alloy, chromium (Cr), titanium (Ti), tantalum (Ta), tungsten (W), indium (In), nickel (Ni), or an alloy including any of the above. In one exemplary embodiment, the gate wiring (22, 26a, 26b) and the storage wiring (27, 28) may have a multilayer structure including two conductive layers (not shown) having different physical characteristics. In such an exemplary embodiment, one of the two conductive layers may be made of a metal having low resistivity, such as an aluminum-based metal, a silver-based metal, or a copper-based metal, so as to reduce signal delay or voltage drop in the gate wiring (22, 26a, 26b) and the storage wiring (27, 28). The other conductive layer may be made of a material, such as a molybdenum-based metal, chromium, titanium, or tantalum, having excellent contact characteristics with other materials, such as Indium Tin Oxide ("ITO") and Indium Zinc Oxide ("IZO"). Exemplary embodiments of the combination of the two conductive layers include a lower chromium layer and an upper aluminum layer, and a lower aluminum layer and an upper molybdenum layer. However, the present invention is not limited thereto, but exemplary embodiments of the gate wiring (22, 26a, 26b) and the storage wiring (27, 28) may be made of various metals and conductors.

A gate insulating layer 30, exemplary embodiments of which may be made of silicon nitride (SiN$_x$), is formed on the gate line 22 and the storage wiring (27, 28).

A pair of semiconductor layers 40a and 40b, exemplary embodiments of which may be made of hydrogenated amorphous silicon or polycrystalline silicon, are formed on the gate insulating layer 30. The semiconductor layers 40a and 40b may have various shapes, exemplary embodiments of which include an island shape and a linear shape. In the present exemplary embodiment, the semiconductor layers 40a and 40b have an island shape.

At an upper part of each of the semiconductor layers 40a and 40b, ohmic contact layers 55a and 56a, exemplary embodiments of which may be made of silicide or n+ hydrogenated amorphous silicon doped with an n-type impurity, are individually formed. The ohmic contact layers 55a and 56a are disposed on each of the semiconductor layers 40a and 40b in pairs.

A pair of first and second data lines 62a and 62b and a pair of first and second drain electrodes 66a and 66b corresponding to the first and second data lines 62a and 62b are formed on the ohmic contact layers 55a and 56a and the gate insulating layer 30.

The first and second data lines 62a and 62b extend in a substantially vertical direction to be disposed substantially perpendicular to the gate lines 22 and the storage line 28, and transmit the data voltage. The first and second data lines 62a, 62b have first and second source electrodes 65a and 66b extending toward the first and second drain electrodes 66a and 66b, respectively. As shown in FIG. 2, one pixel is divided into a pair of subpixels, the first data line 62a transmits a data signal to one subpixel, a first subpixel 82a in the present exemplary embodiment, and the second data line 62b transmits a different data signal to the other subpixel, a second subpixel 82b in the present exemplary embodiment.

The first and second data lines 62a and 62b, the first and second source electrodes 65a and 65b, and the first and second drain electrodes 66a and 66b are collectively referred to as a data wiring.

In one exemplary embodiment, the data wiring (62a, 62b, 65a, 65b, 66a, 66b) is made of a refractory metal, such as chromium, molybdenum-based metal, tantalum, or titanium, and in one exemplary embodiment it may have a multilayer structure of a lower layer (not shown) made of a refractory metal and an upper layer (not shown) made of a low-resistance material. Exemplary embodiments of the multilayer structure include a three-layered structure of a molybdenum layer, an aluminum layer, and a molybdenum layer, in addition to the two-layered structure of the lower chromium layer and the upper aluminum layer or the lower aluminum layer and the upper molybdenum layer described above.

The first and second source electrodes 65a and 65b at least partially overlap the semiconductor layers 40a and 40b, respectively. The first and second drain electrodes 66a and 66b are arranged to be substantially opposed to the first and second source electrodes 65a and 65b above the gate electrodes 26a and 26b, and at least partially overlap the semiconductor layers 40a and 40b, respectively. The ohmic contact layers 55a and 56a are provided between the underlying semiconductor layers 40a and 40b and the overlying first and second source electrodes 65a and 65b and the overlying first and second drain electrodes 66a and 66b so as to reduce contact resistance therebetween.

A passivation layer 70 is formed on the data wiring (62a, 62b, 65a, 65b, 66a, 66b) and the exposed semiconductor layers 40a and 40b. In one exemplary embodiment, the passivation layer 70 is made of an inorganic material, exemplary embodiments of which include silicon nitride or silicon oxide, an organic material having excellent planarization characteristic and photosensitivity, or a low-dielectric-constant insulator, exemplary embodiments of which include a-Si:C:O or a-Si:O:F which may be formed by plasma enhanced chemical vapor deposition ("PECVD"). In one exemplary embodiment, the passivation layer 70 may have a two-layered structure of a lower inorganic layer and an upper organic layer so as to use the excellent characteristics of the organic layer and to protect the expose semiconductor layers 40a and 40b. Exemplary embodiments include configurations wherein a color filer of red, green, or blue may be used as the passivation layer 70.

The first and second subpixel electrodes 82a and 82b are formed on the passivation layer 70 to be arranged in the pixel area and electrically connected to the first and second drain electrodes 66a and 66b through first and second contact holes 76a and 76b, respectively. In one exemplary embodiment, the first and second subpixel electrodes 82a and 82b may be made of a transparent conductor, exemplary embodiments of which include ITO or IZO, or a reflective conductor, exemplary embodiments of which include aluminum.

The first and second subpixel electrodes 82a and 82b are physically and electrically connected to the first and second drain electrodes 66a and 66b through the first and second contact holes 76a and 76b, and in the present exemplary embodiment are applied with different voltages from the first and second drain electrodes 66a and 66b, respectively.

The first and second subpixel electrodes 82a and 82b applied with the voltages form an electric field, together with a common electrode of the upper display plate, and determine the alignment of the liquid crystal molecules between the first and second subpixel electrodes 82a and 82b and the common electrode, respectively.

As described above, referring to FIGS. 1A, 1B and 2, the subpixel electrodes 82a and 82b and the common electrode form the liquid crystal capacitors Clca and Clcb, respectively, and maintain the voltages after the TFTs Qa and Qb are turned off. The storage capacitors Csta and Cstb individually connected in parallel to the liquid crystal capacitors Clca and Clcb in order to increase the voltage maintaining ability are formed by the first and second subpixel electrodes 82a and 82b or the first and second drain electrodes 66a and 66b individually connected to the first and second subpixel electrodes 82a and 82b and the storage wiring (27, 28) arranged to overlap each other.

Referring to FIGS. 2 to 4, one pixel electrode 82 is formed by the first and second subpixel electrodes 82a and 82b that are separated from each other by a predetermined gap 83 and are electrically isolated from each other. The first subpixel electrode 82a has a V-shape, and the second subpixel electrode 82b is formed in an area other than the first subpixel electrode 82a within the pixel. Specifically, the second subpixel electrode 82b may be formed to surround the first subpixel electrode 82a and may include at least one chamfered corner region.

The gap 83 includes slant portions that have an angle of approximately 45° or −45° with respect to the gate line 22, and a vertical portion that connects the slant portions and is arranged substantially parallel to the first and second data lines 62a and 62b.

Although not shown, the first subpixel electrode 82a and the second subpixel electrode 82b may be provided with a domain divider (not shown), such as a cutout or a protrusion, which has an angle of approximately 45° or −45° with respect to the gate line 22. A display region where the pixel electrode 82 is formed is divided into a plurality of domains in accordance with the arrangement of the main directors of the liquid crystal molecules in the liquid crystal layer when an electric field is applied. In the exemplary embodiments where present, the gap 83 and the domain divider divide the pixel electrode 82 into many domains. Each domain is a region including liquid crystal molecules whose directors are tilted in groups toward a specific direction in accordance with an electric field formed between the pixel electrode 82 and the common electrode (see reference numeral 330 in FIG. 7).

As described above, in the present exemplary embodiment the first subpixel electrode 82a has a V-shape, and the second subpixel electrode 82b is formed to surround the first subpixel electrode 82a. Specifically, the second subpixel electrode 82b includes main regions that are close to the slant portions of the gap 83 and have an angle of approximately 45° or −45° with respect to the gate line 22 to control the movements of the liquid crystal molecules, and a bridge region that is close to the vertical portion of the gap 83 and is arranged substantially parallel to the first and second data lines 62a and 62b to connect the main regions.

As shown in FIGS. 2 and 4, the first and second data lines 62a and 62b are formed to partially overlap the second subpixel electrode 82b. In one exemplary embodiment, the first and second data lines 62a and 62b are formed to completely overlap the second subpixel electrode 82b in a widthwise direction. Specifically, in the present exemplary embodiment, the first and second data lines 62a and 62b overlap the bridge region of the second subpixel electrode 82b.

An alignment film (not shown) for aligning the liquid crystal layer may be formed on the first and second subpixel electrodes 82a and 82b and the passivation layer 70.

Next, the sensor area in the first exemplary embodiment of a touch screen display according to the present invention will be described.

Referring to FIGS. 2, 5, and 6, a coupling electrode 122 is formed on the insulating substrate 10 to protrude from a previous-stage gate line 22' arranged substantially in parallel to the gate line 22. A sensor gate electrode 126 is arranged on the insulating substrate 10 between the gate line 22 and the previous-stage gate line 22'. A refresh gate electrode 226 is formed to protrude from the gate line 22. In one exemplary embodiment, the coupling electrode 122, the sensor gate electrode 126, and the refresh gate electrode 226 may be formed in the same layer and of the same material as the above-described gate wiring (22, 26a, 26b).

A gate insulating layer 30 is formed on the coupling electrode 122, the sensor gate electrode 126, and the refresh gate electrode 226.

A sensor semiconductor layer 140 formed to overlap the sensor gate electrode 126 and a refresh semiconductor layer 240 formed to overlap the refresh gate electrode 226 are formed on the gate insulating layer 30. In one exemplary embodiment, the sensor semiconductor layer 140 and the refresh semiconductor layer 240 may be made of hydrogenated amorphous silicon or polycrystalline silicon.

At an upper part of each of the sensor semiconductor layer 140 and the refresh semiconductor layer 240, ohmic contact layers 155 and 156 or 255 and 256, exemplary embodiments of which may be made of silicide or n+ hydrogenated amorphous silicon doped with an n-type impurity, are formed. The ohmic contact layers 155 and 156 are disposed on the sensor semiconductor layer 140 in pairs, and the ohmic contact layers 255 and 256 are disposed on the refresh semiconductor layer 240 in pairs.

A power line 162, a refresh line 262, and an output line 168 are formed on the ohmic contact layers 155, 156, 255, and 256 and the gate insulating layer 30.

A sensor source electrode 165 formed on the ohmic contact layer 155 at least partially overlaps the sensor semiconductor layer 140, and is connected to the power line 162 through a bridge electrode 184. A sensor drain electrode 166 formed on the ohmic contact layer 156 at least partially overlaps the sensor semiconductor layer 140, and is connected to the output line 168 while being substantially opposed to the sensor source electrode 165 around the sensor gate electrode 126.

A refresh source electrode 265 protrudes from the refresh line 262 and at least partially overlaps the refresh semiconductor layer 240. The refresh drain electrode 266 at least partially overlaps the refresh semiconductor layer 240 while being substantially opposed to the refresh source electrode 265 around the refresh gate electrode 226.

The ohmic contact layers 155 and 156 are provided between the underlying sensor semiconductor layer 140 and the overlying sensor source electrode 165 and sensor drain electrode 166 so as to reduce contact resistance therebetween. The ohmic contact layers 255 and 256 are provided between the underlying refresh semiconductor layer 240 and the overlying refresh source electrode 265 and refresh drain electrode 266 so as to reduce contact resistance therebetween.

The passivation layer 70 is formed on the power line 162, the refresh line 262, and the output line 168.

The bridge electrode 184 formed on the passivation layer 70 is connected to the power line 162 through a contact hole 172 and is also connected to the sensor source electrode 165 through a contact hole 175. A lower sensor electrode 182 formed on the passivation layer 70 overlaps the coupling electrode 122 with the gate insulating layer 30 and the passivation layer 70 interposed therebetween, thereby forming a coupling capacitor. The lower sensor electrode 182 is connected to the sensor gate electrode 126 through a contact hole 176, and is also connected to the refresh drain electrode 266 through a contact hole 170. In the present exemplary embodiment, the bridge electrode 184 and the lower sensor electrode 182 are made of a transparent conductor, exemplary embodiments of which include ITO or IZO, or a reflective conductor, such as aluminum. In one exemplary embodiment, the bridge electrode 184 and the lower sensor electrode 182 are formed from substantially the same material at substantially the same time as the first and second sub-pixel electrodes 82a and 82b.

The sensor switching element Ts is a three-terminal element having the sensor gate electrode 126 connected to the lower sensor electrode 182 overlapping the coupling electrode 122, the sensor source electrode 165 connected to the power line 162, and the sensor drain electrode 166 connected to the output line 168. The refresh switching element Tr is a three-terminal element having the refresh gate electrode 226 connected to the gate line 22, the refresh source electrode 265 connected to the refresh line 262, and the refresh drain electrode 266 connected to the lower sensor electrode 182.

Figure 7:
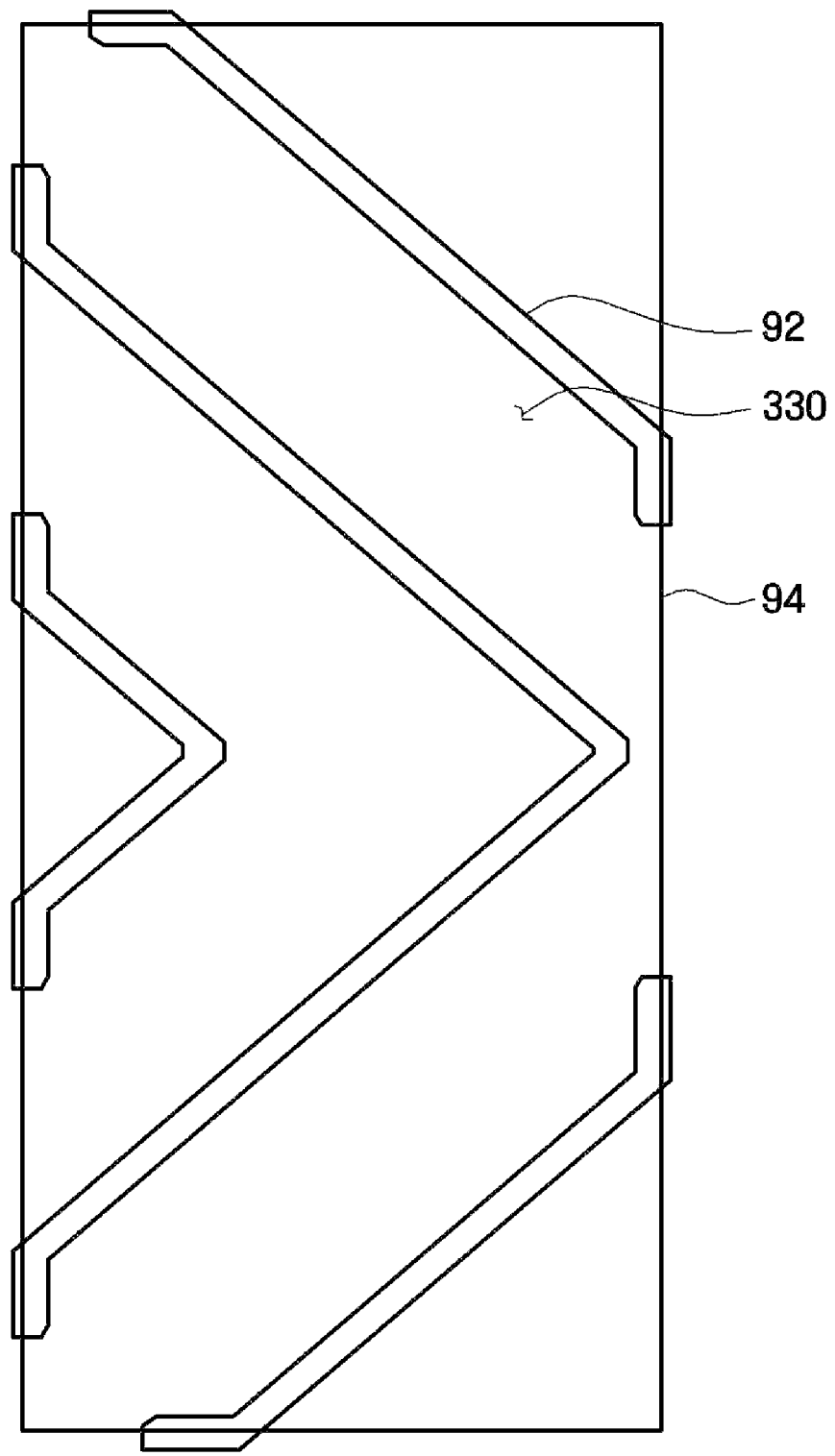
FIG. 7 is a top plan view of an exemplary embodiment of an upper display plate coupled to the exemplary embodiment of a lower display plate shown in FIG. 2.
Figure 8:
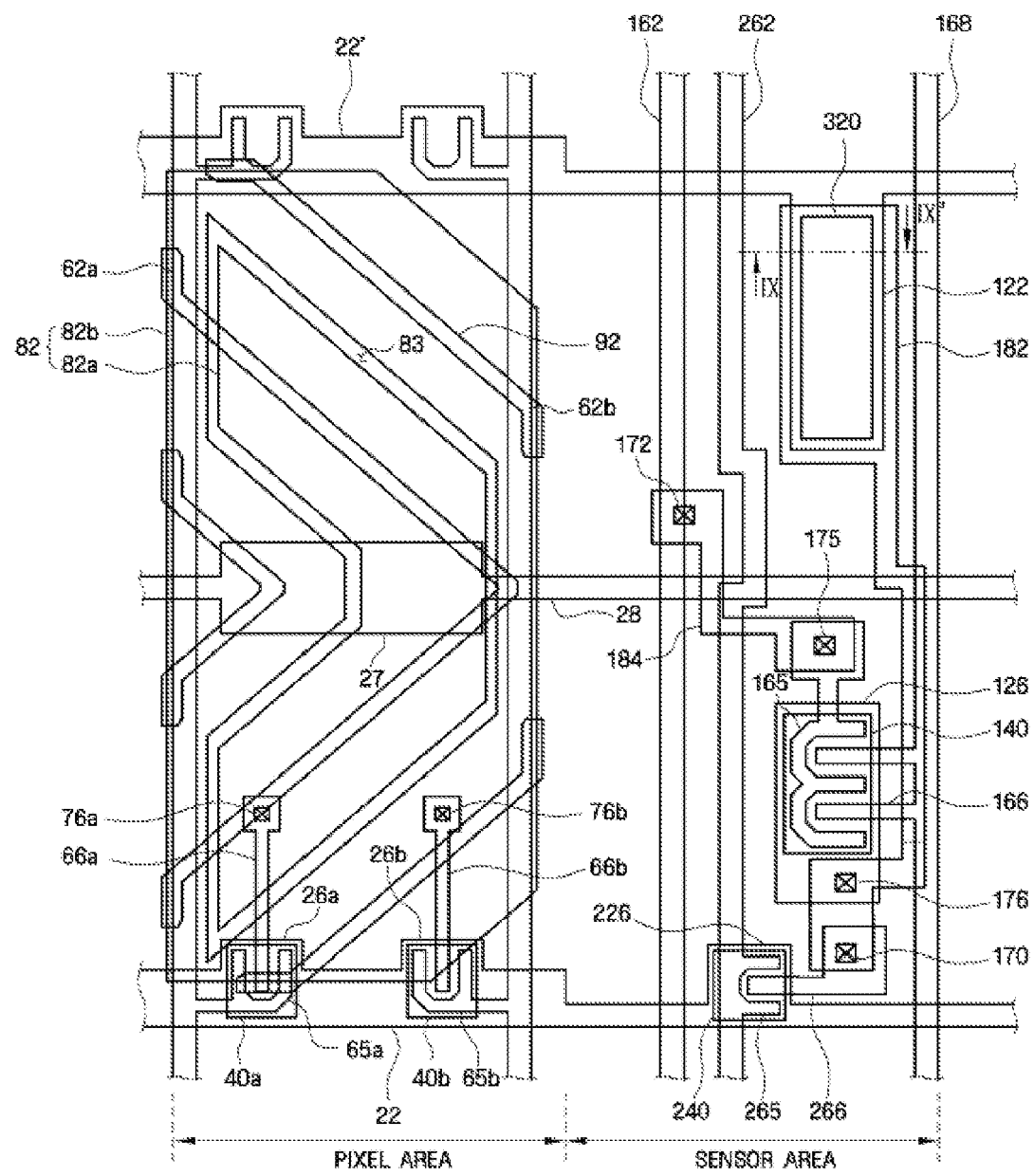
FIG. 8 is a top plan view of an exemplary embodiment of a touch screen display including the exemplary embodiment of a lower display plate shown in FIG. 2 and the exemplary embodiment of an upper display plate shown in FIG. 7.
Figure 9:
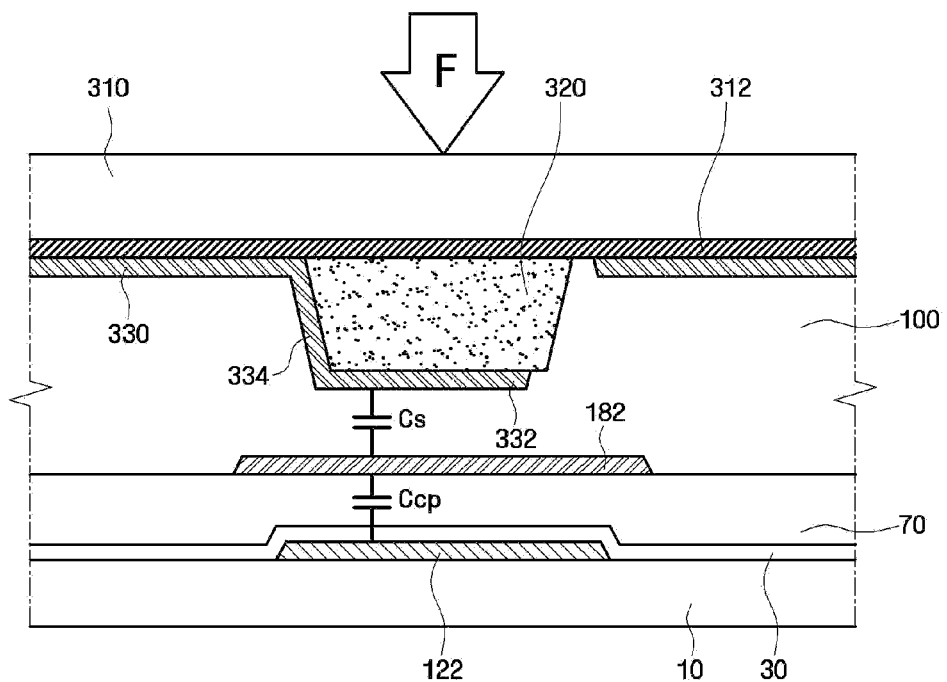
FIG. 9 is a cross-sectional view of the exemplary embodiment of a touch screen display shown in FIG. 8 taken along line IX-IX.

Next, an exemplary embodiment of the upper display plate and the touch screen display will be described with reference to FIGS. 7 to 9. FIG. 7 is a top plan view of an exemplary embodiment of the upper display plate coupled to the exemplary embodiment of a lower display plate shown in FIG. 2. FIG. 8 is a top plan view of an exemplary embodiment of a touch screen display including the exemplary embodiment of a lower display plate shown in FIG. 2 and the exemplary embodiment of an upper display plate shown in FIG. 7. FIG. 9 is a cross-sectional view of the exemplary embodiment of a touch screen display taken along line IX-IX of FIG. 8.

The black matrixes 312 are formed on an insulating substrate 310, exemplary embodiments of which may be made of transparent glass, in order to suppress light leakage and to define the pixel area. The black matrixes 312 may be formed to correspond to the gate line 22, the first and second data lines 62a and 62b, and the TFTs. Alternative exemplary embodiments include configurations wherein the back matrixes 312 may be formed on the lower display plate. In one exemplary embodiment, the black matrixes 312 may be made of a metal (or metal oxide), exemplary embodiments of which include chromium or chromium oxide, and organic black resist.

Color filters (not shown) of red, green, and blue may be sequentially arranged in the pixel area between the black matrixes 312. Alternative exemplary embodiments include configurations wherein the color filters may be formed on the lower display plate.

A sensor spacer 320, which is smaller than a cell gap between the lower display plate and the upper display plate, is formed on the insulating substrate 310. The sensor spacer 320 has a flat surface opposed to the lower sensor electrode 182 and a side portion formed at an edge to the flat surface, and is arranged to overlap the lower sensor electrode 182. The sensor spacer 320 may be made of substantially the same material as a cell gap spacer (not shown) which is interposed between the lower display plate and the upper display plate in order to maintain the cell gap. In one exemplary embodiment, the sensor spacer 320 may be made of an organic material, exemplary embodiments of which include photosensitive resin.

A common electrode 330, exemplary embodiments of which may be made of a transparent conductive material, exemplary embodiments of which include ITO or IZO, is formed at an upper part of the insulating substrate 310. The common electrode 330 faces the first and second subpixel electrodes 82a and 82b, and in the present exemplary embodiment includes a domain divider 92, such as a cutout or a protrusion, which has an angle of approximately 45° or −45° with respect to the gate line 22. An upper sensor electrode 332 is formed on the sensor spacer 320 and is connected to the common electrode 330 through a connection electrode 334. The upper sensor electrode 332 will be described below in detail.

An alignment film (not shown) for aligning the liquid crystal molecules may be formed on the common electrode 330.

The lower display plate and the upper display plate are arranged opposite to and coupled to each other, and a liquid crystal material is injected between the two display plates and vertically aligned. Thus, the basic structure of an exemplary embodiment of a touch screen display according to the present invention is formed.

The liquid crystal molecules in the liquid crystal layer 100 are aligned in such a manner that the directions thereof are substantially perpendicular to the lower display plate and the upper display plate with no electrical field applied between the pixel electrode 82 and the common electrode 330. In the present exemplary embodiment, the liquid crystal molecules have negative dielectric anisotropy.

The touch screen display is formed by arranging polarizing plates, a backlight, and other such components on the basic structure. In one exemplary embodiment, the polarizing plates are individually arranged on both sides of the basic structure in such a manner that the transmission axis of one of the polarizing plates is in parallel to the gate line 22, and the transmission axis of the other polarizing plate is perpendicular to the gate line 22.

If an electric field is applied between the lower display plate and the upper display plate, an electrical field substantially perpendicular to the two display plates is formed in most of the area, but a horizontal electric field is formed near the gap 83 of the pixel electrode 82 and the domain divider 92 of the common electrode 330. The horizontal electric field assists the alignment of the liquid crystal molecules in each domain, thereby increasing a viewing angle of the display.

In the present exemplary embodiment, the liquid crystal molecules have negative dielectric anisotropy. Accordingly, when an electric field is applied to the liquid crystal molecules, the liquid crystal molecules in each domain are tilted to be substantially perpendicular to the gap 83 or the domain divider 92 for dividing the domain. Therefore, the liquid crystal molecules are reversely tilted on both sides of the gap 83 or the domain divider 92. In addition, the slant portions of the gap 83 or the slant portions of the domain divider are symmetric with respect to the center of the pixel, such that the liquid crystal molecules are substantially tilted in four directions at an angle of 45° or −45° with respect to the gate line 22. As such, the optical characteristics of the display are modified by the liquid crystal molecules titled in the four directions, and as a result, a viewing angle is increased.

Figure 10:
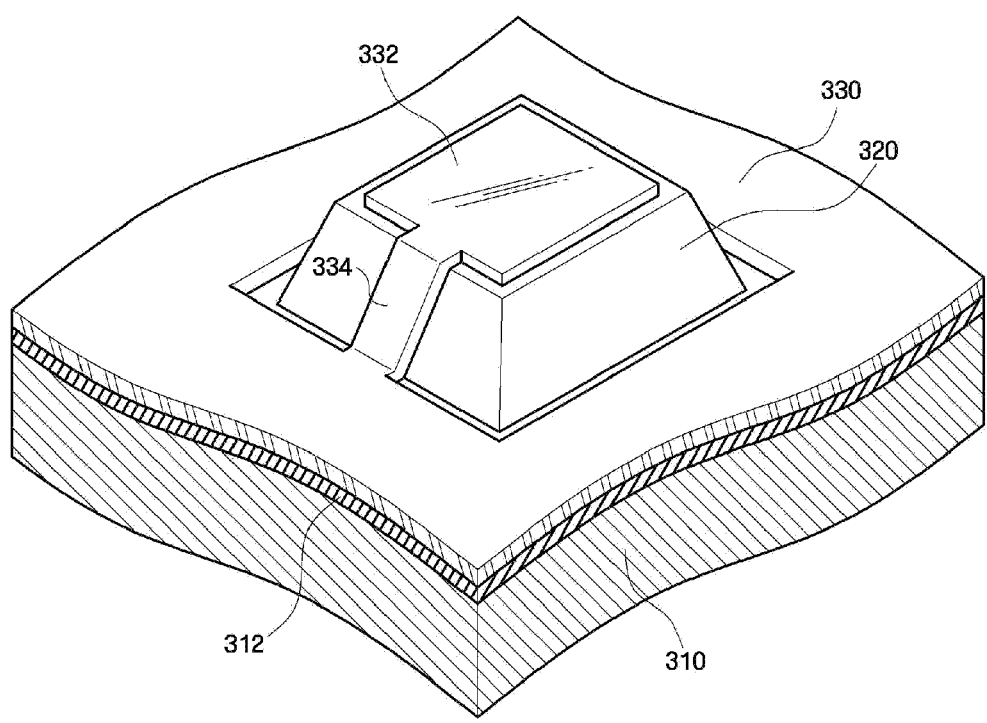
FIG. 10 is a bottom perspective view of the exemplary embodiment of an upper display plate shown in FIG. 9.
Figure 11:
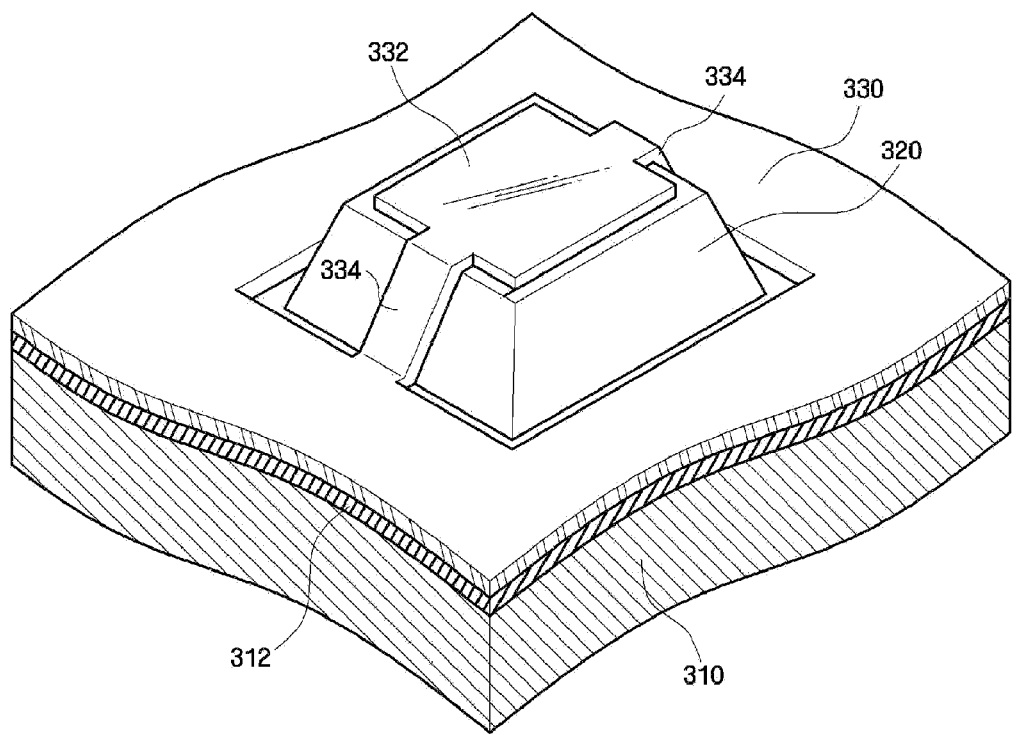
FIG. 11 is a bottom perspective view illustrating another exemplary embodiment of an upper display plate shown in FIG. 9.

The upper display panel of the first exemplary embodiment of a touch screen display according to the present invention will now be described in detail with reference to FIGS. 9 to 11. FIG. 10 is a bottom perspective view of the exemplary embodiment of an upper display plate shown in FIG. 9. FIG.

11 is a bottom perspective view illustrating another exemplary embodiment of an upper display plate shown in FIG. 9.

Referring to FIGS. 9 and 10, the upper sensor electrode 332 is arranged on the sensor spacer 320, and a cutout is formed at an edge of the upper sensor electrode 332 to partially separate the upper sensor electrode 332 and the common electrode 330. Specifically, the upper sensor electrode 332 is arranged on the flat surface of the sensor spacer 320 opposed to the lower sensor electrode 182, and is electrically connected to the common electrode 330. The upper sensor electrode 332 is connected to the common electrode 330 by the connection electrode 334 formed in the side portion of the sensor spacer 320.

When an external force F is applied to the touch screen display, the upper sensor electrode 332 and the lower sensor electrode 182 approach each other, and capacitance of the sensor capacitor Cs between the upper sensor electrode 332 and the lower sensor electrode 182 is increased. A touch operation is determined on the basis of the change in capacitance of the sensor capacitor Cs.

Capacitance of the sensor capacitor Cs is determined by the area of the upper sensor electrode 332 opposed to the lower sensor electrode 182 and the area of the connection electrode 334 formed in the side portion of the sensor spacer 320. In this exemplary embodiment, no conductive layer connected to the common electrode 330 is formed in the side portion of the sensor spacer 320, excluding the connection electrode 334. Therefore, capacitance of the sensor capacitor Cs is substantially determined by the area of the upper sensor electrode 332. If the entire side portion of the sensor spacer 320 is covered with a conductive layer connecting the upper sensor electrode 332 and the common electrode 330, capacitance of the sensor capacitor Cs varies in accordance with the shape of the sensor spacer 320, specifically, the shape of the side portion of the sensor spacer 320. For this reason, it is difficult to obtain the sensor capacitor Cs having uniform capacitance over the touch screen display. In contrast, in exemplary embodiments embodiment wherein no conductive layer connected to the common electrode 330 is formed in the side portion of the sensor spacer 320, excluding the connection electrode 334, it is possible to implement the sensor capacitor Cs having uniform capacitance without being significantly influenced by the shape of the sensor spacer 320.

In particular, when the upper sensor electrode 332 has a smaller area than the flat surface of the sensor spacer 320, it is possible to implement the sensor capacitor Cs having uniform capacitance while ensuring a process margin.

In order to suppress an influence of the connection electrode 334 formed in the side portion of the sensor spacer 320 on the sensor capacitor Cs to a minimum amount, in one exemplary embodiment the connection electrode 334 has a width smaller than the upper sensor electrode 332.

An exemplary embodiment in which the upper sensor electrode 332 and the common electrode 330 are connected with each other by the single connection electrode 334 has been described, but this is not intended to limit the present invention. For example, as shown in FIG. 11, the upper sensor electrode 332 and the common electrode 330 may be electrically connected with each other by two or more connection electrodes 334.

Figure 12:
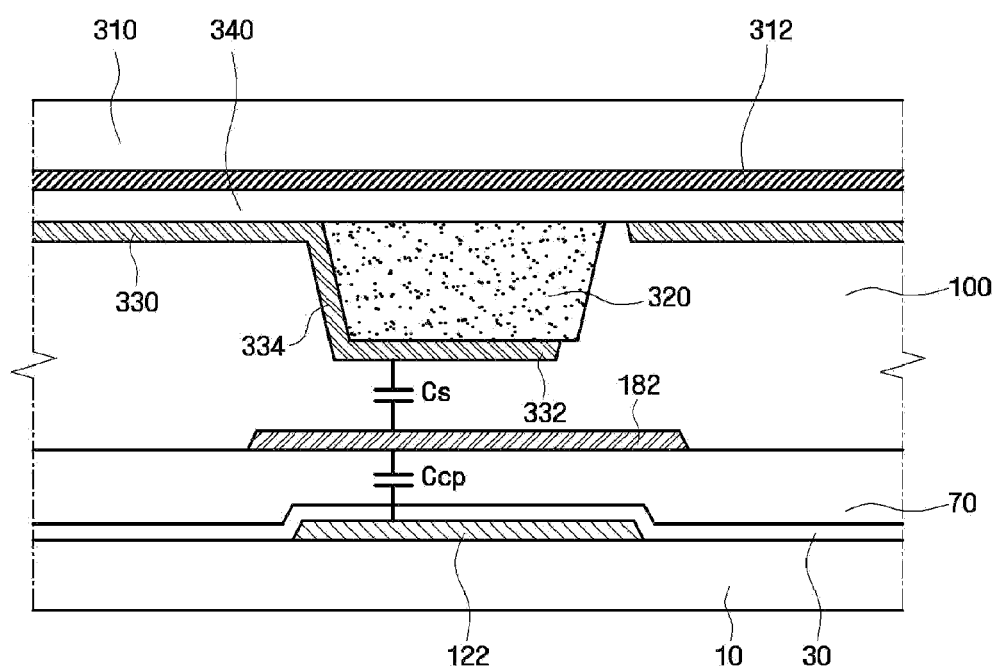
FIG. 12 is a cross-sectional view of a second exemplary embodiment of a touch screen display according to the present invention.
Figure 13:
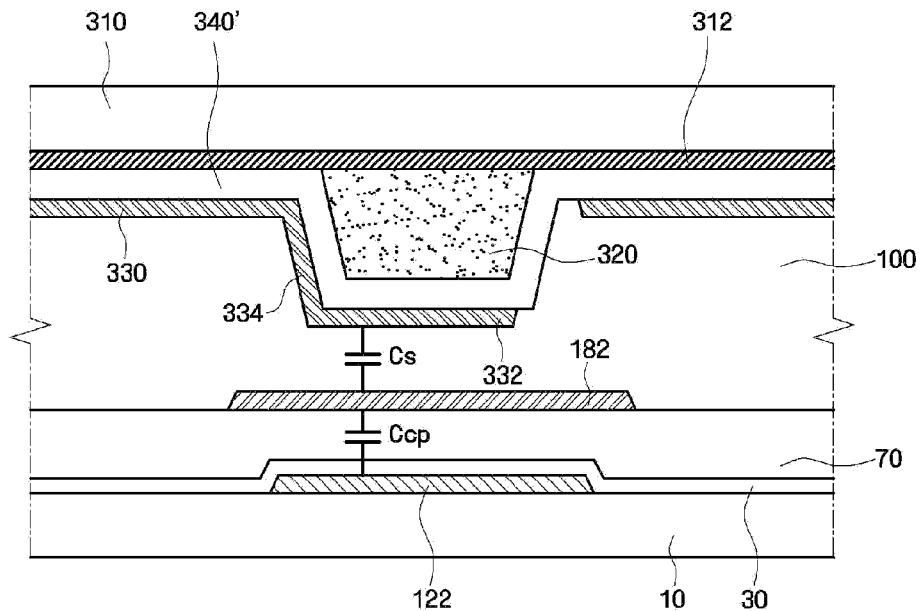
FIG. 13 is a cross-sectional view of a third exemplary embodiment of a touch screen display according to the present invention.
Figure 14:
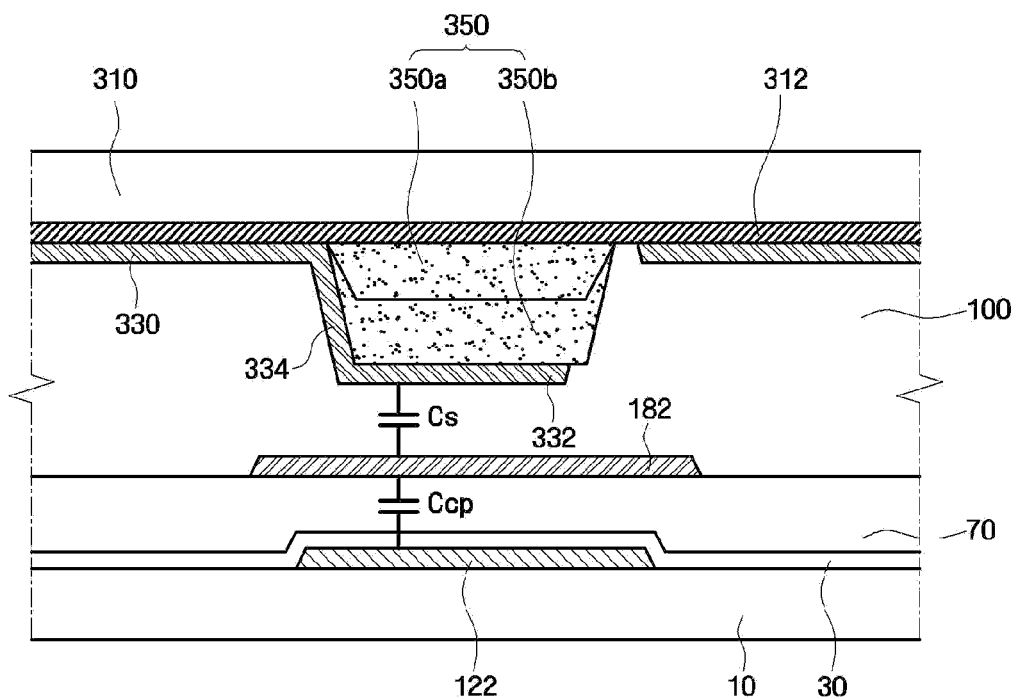
FIG. 14 is a cross-sectional view of fourth exemplary embodiment of a touch screen display according to the present invention.
Figure 15:
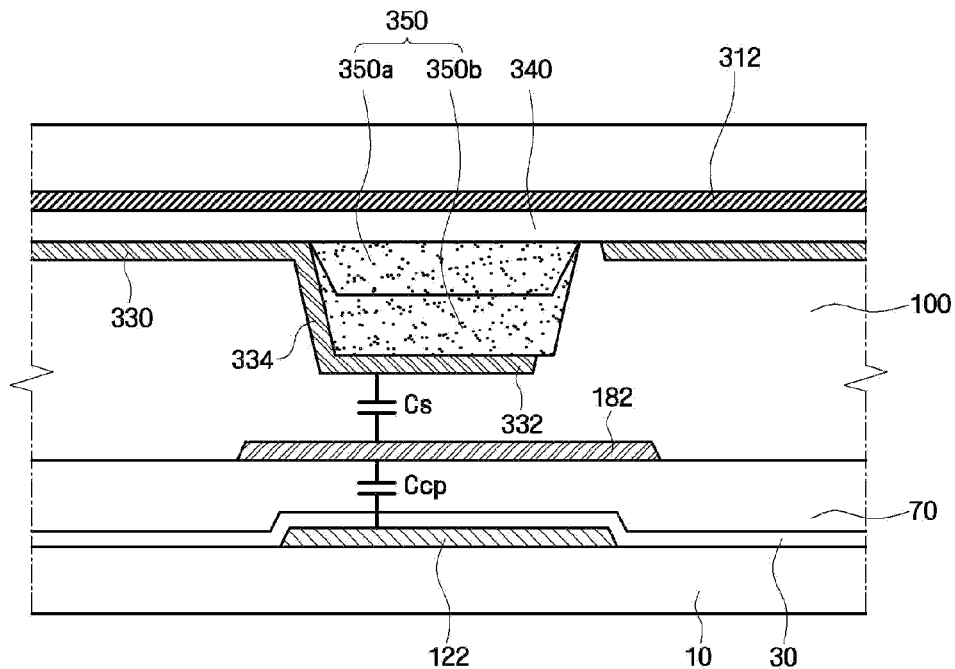
FIG. 15 is a cross-sectional view of a fifth exemplary embodiment of a touch screen display according to the present invention.
Figure 16:
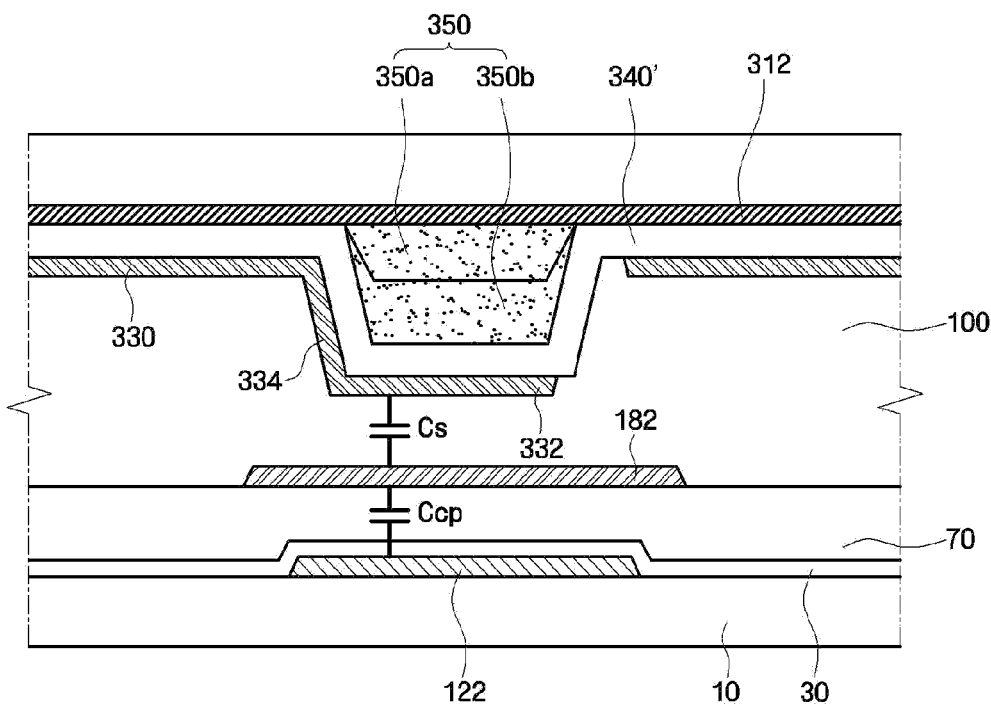
FIG. 16 is a cross-sectional view of sixth exemplary embodiment of a touch screen display according to the present invention.

Exemplary embodiments include configurations wherein the sensor spacer 320 may be formed in the form of a color filter, and overcoat layers may be provided at upper and lower parts of the sensor spacer 320. Touch screen displays according to second through sixth exemplary embodiments of the present invention will now be described in detail with reference FIGS. 12 to 16. FIG. 12 is a cross-sectional view of a second exemplary embodiment of a touch screen display according to the present invention. FIG. 13 is a cross-sectional view of a third exemplary embodiment of a touch screen display according to the present invention. FIG. 14 is a cross-sectional view of a fourth exemplary embodiment of a touch screen display according to the present invention. FIG. 15 is a cross-sectional view of a fifth exemplary embodiment of a touch screen display according to the present invention. FIG. 16 is a cross-sectional view of a sixth exemplary embodiment of a touch screen display according to the present invention. For convenience of explanation, components having the same functions as the components in the above-described embodiment (FIG. 9) are represented by the same reference numerals, and descriptions thereof will be omitted. Hereinafter, a description will be provided focusing on differences.

Referring to FIG. 12, an overcoat layer 340 may be formed between the insulating substrate 310 and the sensor spacer 320 to planarize the laminate.

Referring to FIG. 13, an insulating layer 340' may be formed between the sensor spacer 320 and the upper sensor electrode 332.

Referring to FIG. 14, a sensor spacer 350 arranged between the upper sensor electrode 332 and the insulating substrate 310 is a laminate of at least one color filter (350a, 350b). In this exemplary embodiment, an example in which a first color filter 350a and a second color filter 350b are laminated on the insulating substrate 310 will be described. In order to make the area of the upper sensor electrode 332 uniform, the second color filter 350b may be formed to entirely cover the first color filter 350a.

Referring to FIG. 15, an overcoat layer 340 may be formed between the insulating substrate 310 and the sensor spacer 350 including a laminate of at least one color filter (350a, 350b).

Referring to FIG. 16, an insulating layer 340' may be formed between the sensor spacer 350 including a laminate of at least one color filter (350a, 350b) and the upper sensor electrode 332.

Exemplary embodiments of the overcoat layer 340 and the insulating layer 340' may be made of an organic material or an inorganic material.

Figure 17:
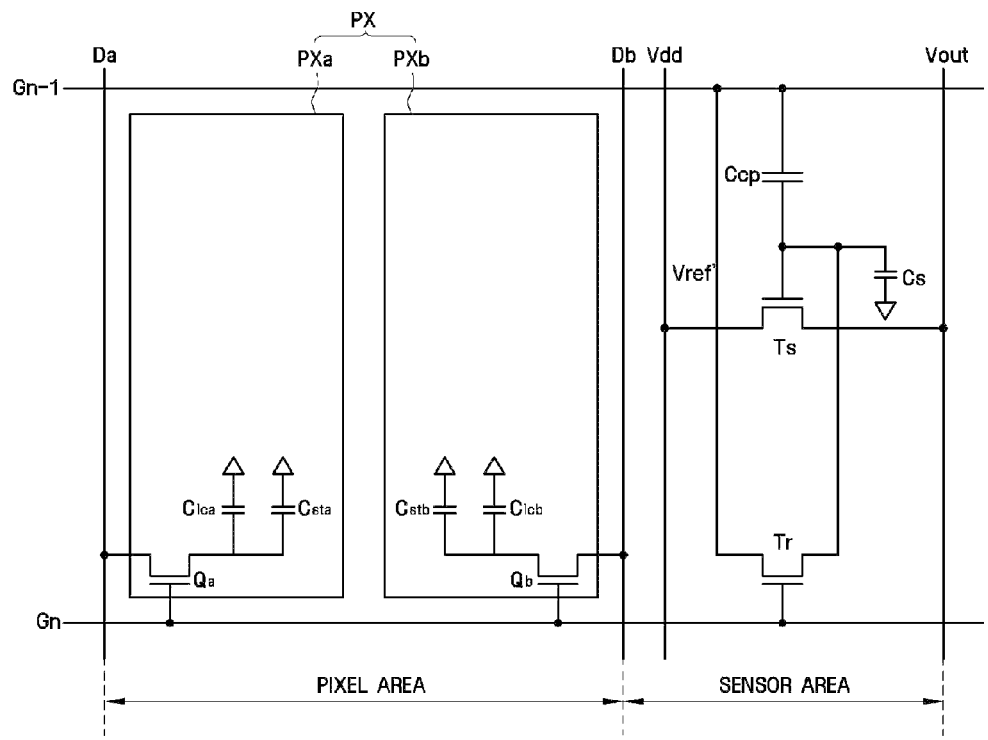
FIG. 17 shows an equivalent circuit diagram of another exemplary embodiment of one pixel of an exemplary embodiment of a touch screen display according to the present invention.

In the foregoing exemplary embodiments, an exemplary embodiment in which the refresh line Vref for supplying the refresh voltage is separately provided has been described, but this is not intended to limit the present invention. In one exemplary embodiment, as shown in FIG. 17, the refresh source electrode of the refresh switching element Tr may be connected to the (n−1)th gate line Gn−1 through a refresh line Vref. FIG. 17 shows an alternative exemplary embodiment of the equivalent circuit diagram shown in FIG. 1. Therefore, if the gate-on voltage Von is applied to the n-th gate line Gn, the gate-off voltage Voff applied to the (n−1)th gate line Gn−1 is transmitted to the sensor gate electrode through the refresh switching element Tr. As a result, even if no additional refresh voltage is supplied, the gate-off voltage Voff flowing in the previous-stage gate line may be used as the refresh voltage, thereby refreshing the sensor switching element Ts.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A touch screen display comprising:
a first substrate;
a lower sensor electrode disposed on the first substrate;
a second substrate disposed substantially opposite to the first substrate;
a sensor spacer disposed on the second substrate and aligned with the lower sensor electrode;
a common electrode disposed on the second substrate;
an upper sensor electrode disposed on the sensor spacer and connected to the common electrode; and
a cutout disposed in the common electrode, wherein the upper sensor electrode is disposed within the cutout and at least two edges defining the upper sensor electrode are spaced apart from the common electrode in a plan view,
wherein when touch pressure is applied to the first or second substrate, a change in capacitance is generated due to a change in a distance between the lower sensor electrode and the upper sensor electrode at a touch position, such that the touch position is detected on the basis of the change in capacitance.

2. The touch screen display of claim 1, wherein:
the sensor spacer includes a flat surface disposed substantially opposite to the first substrate and a side portion disposed at an edge of the flat surface; and
the upper sensor electrode is disposed on the flat surface.

3. The touch screen display of claim 2, wherein the upper sensor electrode has an area smaller than the flat surface of the sensor spacer.

4. The touch screen display of claim 2, further comprising a connection electrode disposed on the side portion of the sensor spacer which connects the upper sensor electrode and the common electrode.

5. The touch screen display of claim 4, wherein the connection electrode has a width smaller than the upper sensor electrode.

6. The touch screen display of claim 4, wherein two or more connection electrodes are disposed on the side portion of the sensor spacer.

7. The touch screen display of claim 1, wherein the sensor spacer comprises an organic material.

8. The touch screen display of claim 7, wherein the sensor spacer comprises photosensitive resin.

9. The touch screen display of claim 8, further comprising a cell gap spacer interposed between the first and second substrate which maintains a cell gap between the first and second substrates, wherein the sensor spacer comprises substantially the same material as the cell gap spacer.

10. The touch screen display of claim 8, wherein the sensor spacer is a laminate of at least one color filter.

11. The touch screen display of claim 10, wherein the sensor spacer includes a first color filter and a second color filter sequentially laminated on the second substrate, and the second color filter entirely covers the first color filter.

12. The touch screen display of claim 11, further comprising an insulating layer interposed between the sensor spacer and the upper sensor electrode.

13. The touch screen display of claim 1, further comprising an overcoat layer interposed between the substrate and the sensor spacer.

14. A method of manufacturing a touch screen display, the method comprising:
providing a first substrate;
disposing a lower sensor electrode on the first substrate;
disposing a second substrate substantially opposite to the first substrate;
disposing a sensor spacer on the second substrate and aligning the sensor spacer with the lower sensor electrode;
disposing a common electrode on the second substrate;
disposing an upper sensor electrode on the sensor spacer and connected to the common electrode; and
disposing a cutout in the common electrode, wherein the upper sensor electrode is disposed within the cutout and at least two edges defining the upper sensor electrode are spaced apart from the common electrode in a plan view,
wherein when touch pressure is applied to the first or second substrate, a change in capacitance is generated due to a change in a distance between the lower sensor electrode and the upper sensor electrode at a touch position, such that the touch position is detected on the basis of the change in capacitance.

15. The touch screen display of claim 1, wherein the cutout defines a gap between at least one side of the edge of the upper sensor electrode and the common electrode in a plan view.

16. The method of manufacturing a touch screen display of claim 14, wherein the cutout defines a gap between at least one side of the edge of the upper sensor electrode and the common electrode in a plan view.

* * * * *